United States Patent [19]

Lehmann

[11] 4,202,794
[45] May 13, 1980

[54] CALCIUM YTTRIUM BORATE PHOSPHOR COMPOSITION

[75] Inventor: Willi Lehmann, Murrysville, Pa.

[73] Assignee: Westinghouse Electric Corp., Pittsburgh, Pa.

[21] Appl. No.: 954,497

[22] Filed: Oct. 25, 1978

[51] Int. Cl.² ............................................. C09K 11/46
[52] U.S. Cl. ............................................. 252/301.4 R
[58] Field of Search ................................. 252/301.4 R

[56] References Cited

U.S. PATENT DOCUMENTS 3,449,258  6/1969  Ropp et al. ................... 252/301.4 R

FOREIGN PATENT DOCUMENTS 2410134  9/1974  Fed. Rep. of Germany .... 252/301.4 R

OTHER PUBLICATIONS

Blasse "J. Solid State Chem.", vol. 4, pp. 52–54, 1972.

Primary Examiner—Jack Cooper
Attorney, Agent, or Firm—R. S. Lombard

[57] ABSTRACT

An improved phosphor composition excited by ultraviolet radiation to emit in the red region of the visible spectrum. The phosphor composition is expressible by the general constituent formulation $xCaO \cdot y(Y+Eu)_2O_3 \cdot zB_2O_3$ wherein x is from about 32 to 38, y is from about 31 to 41 and z is from about 25 to 31, with x, y and z expressing relative molar proportions of the constituents. The phosphor is activated by Eu. The relative molar proportions of the phosphor constituents are such that they fall within a predetermined area of a specified ternary phase diagram.

3 Claims, 6 Drawing Figures

CALCIUM YTTRIUM BORATE PHOSPHOR COMPOSITION

BACKGROUND OF THE INVENTION

This invention relates to phosphor compositions, and in particular to phosphor compositions excited by ultraviolet radiation to emit in the red region of the visible spectrum.

Europium activated yttrium oxide (YOE) is a well known red emitted phosphor. It is used in many devices such as cathode ray tubes and lamps. This phosphor though is quite expensive for large-scale use, especially in lamps. Other red-emitting phosphors are known, such as, calcium yttrium borate described by the formula $CaYBO_4$:Eu as disclosed by G. Blasse in *The Journal Of Solid State Chemistry*, Vol. 4, page 52, 1972. A problem with this phosphor is that its efficiency of photoluminescence under excitation by 254 nanometer ultraviolet is about 40% of the YOE phosphor, which is insufficient for lamp use.

SUMMARY OF THE INVENTION

There is provided a phosphor composition excited by ultraviolet radiation to emit in the red region of the visible spectrum. The phosphor composition is expressible by the general constituent formulation $xCaO.y(U+Eu)O_{3/2}.zBO_{3/2}$ wherein x is from about 32 to 38, y is from about 31 to 41 and z is from about 25 to 31, with x, y and z expressing relative molar proportions of the constituents. The phosphor is activated by Eu with the gram-atom ratio of Y to Eu being from about 5:1 to 40:1. The relative molar proportions of the phosphor constituents are such that they fall within a predetermined area of a ternary phase diagram.

BRIEF DESCRIPTION OF THE DRAWINGS

For a better understanding of the invention, reference may be had to the accompanying drawings, in which.

DESCRIPTION OF THE PREFERRED EMBODIMENTS

Figure 1:
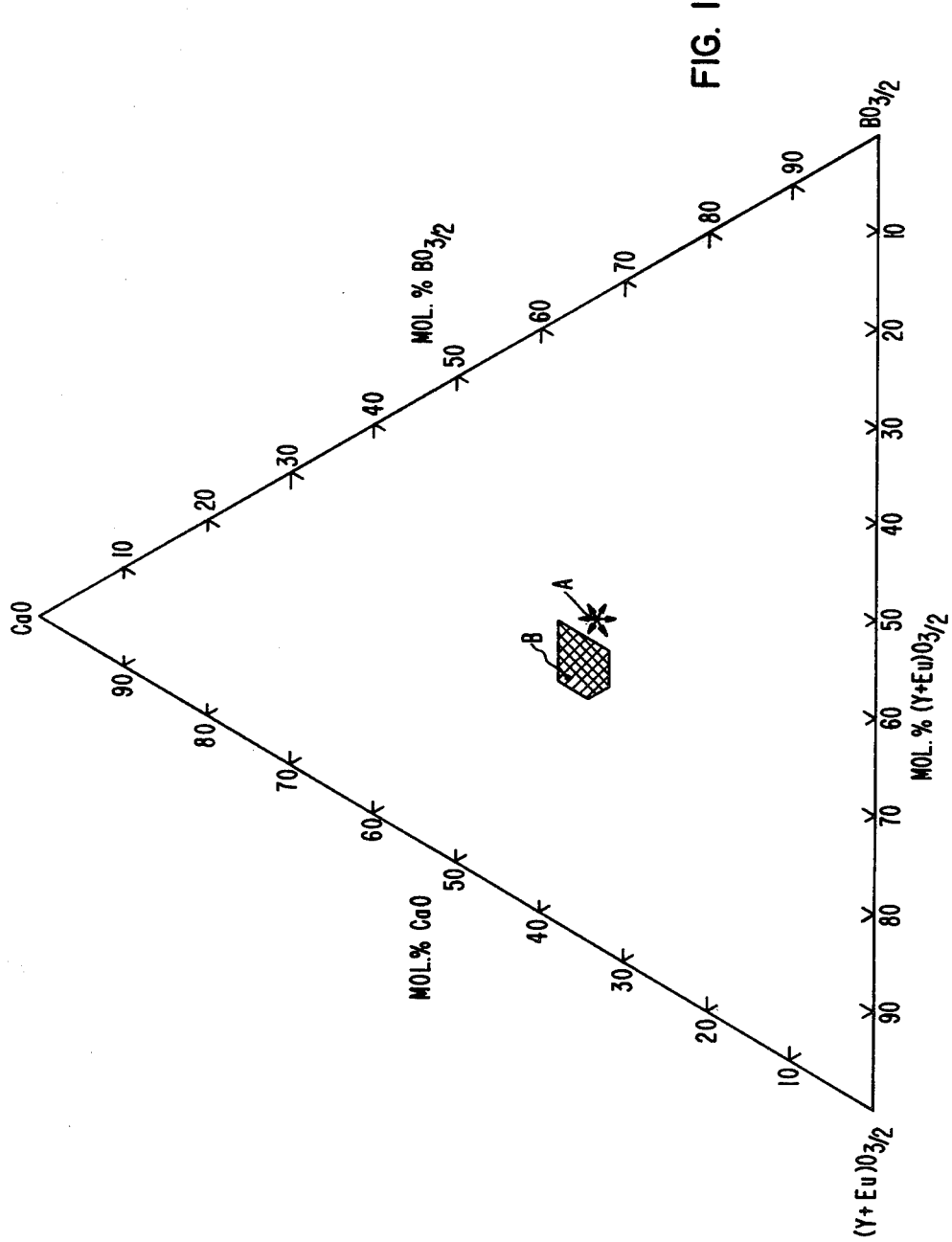
FIG. 1 is a ternary phase diagram involving CaO, $(Y+Eu)_2O_3$ and $B_2O_3$.
Figure 2A:
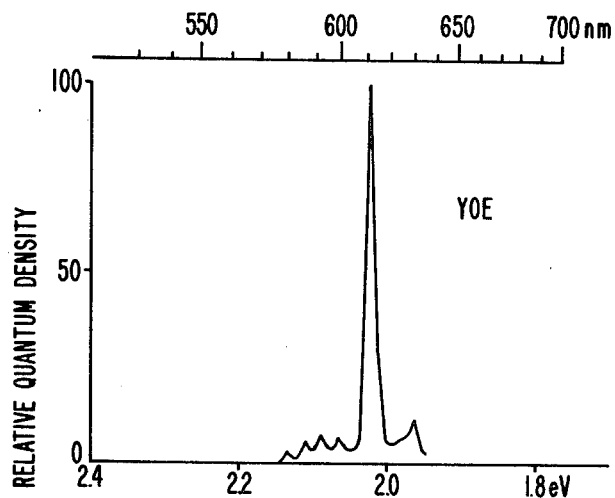
FIGS. 2A, 2B and 2C show the emission spectra of YOE, $CaYBO_4$:Eu, and $Ca(Y+Eu)B_{0.7}O_{3.55}$.
Figure 2B:
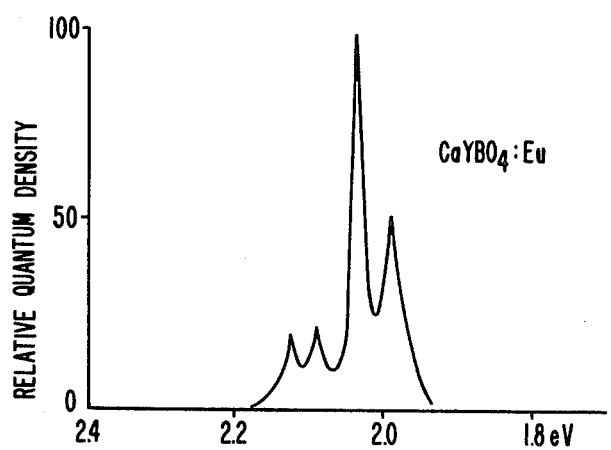
Figure 2C:
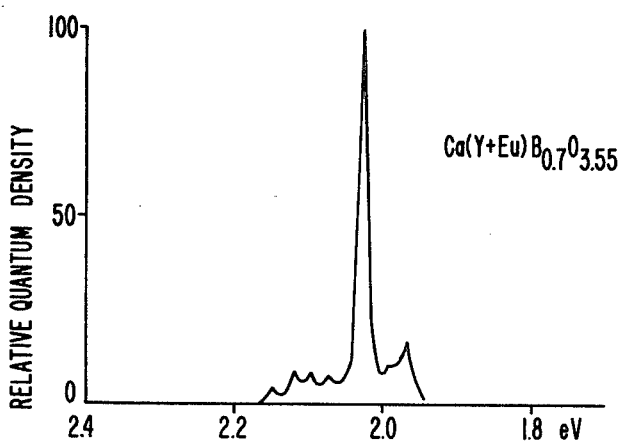

With reference to FIG. 1, an improved phosphor composition is provided which is excited by ultraviolet radiation of 254 nm to emit in the red portion of the visible spectrum. The phosphor is expressible by the general constituent formulation $xCaO.y(Y+Eu)O_{3/2}.zBO_{3/2}$ wherein x is from about 32 to 38, y is from about 32 to 41 and z is from about 25 to 31, wherein x, y and z represent relative molar proportions of the constituents. The phosphor is activated by Eu with the gram-atom ratio of Y to Eu being from about 5:1 to 40:1. The relative molar proportions of said phosphor constituents fall within the cross-hatched area of the ternary phase diagram shown in FIG. 1. The ternary phase diagram at point A represents the previously known compound $CaYBO_4$ having an atom ratio of Ca.Y.B equal to 1:1:1. Deviations from point A are essentially possible in six different directions indicated by the arrows in FIG. 1. It has been discovered that, of the six directions, a variation from point A towards point B (meaning reduced boron oxide concentration) causes a rapid increase in efficiency of photoluminescence. Simultaneously, the emission spectrum changes from that of $CaYBO_4$:Eu (FIG. 2B) to a spectrum (FIG. 2C) closely resembling that of YOE (FIG. 2A). The phosphor compositions represented by the cross-hatched area in FIG. 1 are chemically stable and have acceptable efficiencies in comparison to YOE, with the best composition occurring at point B which has an efficiency of about 81% of YOE. This material has a formula $Ca(Y+Eu)B_{0.7}O_{3.55}$ corresponding to a molar ratio Ca/(Y+EU)/B of 37/37/26. Lowering the boron oxide concentration outside of the cross-hatched area reduces the efficiency and causes the material to be chemically unstable in water probably because of the presence of unreacted CaO.

Figure 3:
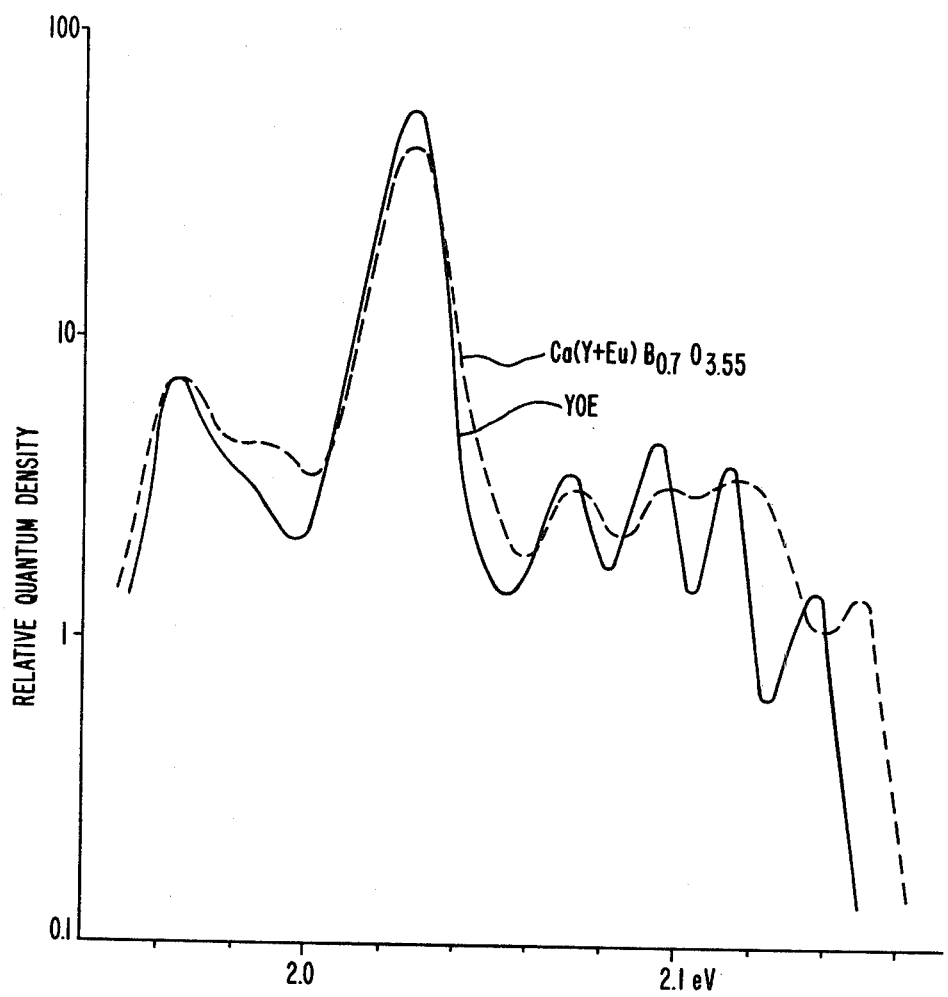
FIG. 3 is a graph showing the difference between emission spectra of YOE and $Ca(Y+Eu)B_{0.7}O_{3.55}$; and, FIG. 4 is a graph showing relative efficiency of $Ca(Y+Eu)B_{0.7}O_{3.55}$ excited by 254 nm ultraviolet (YOE=100).

The X-ray powder diffraction spectra of $Ca(Y+Eu)B_{0.7}O_{3.55}$ show lines closely the same as those of ordinary $Y_2O_3$. This together with the close similarity of the emission spectra of $Ca(Y+EU)B_{0.7}O_{3.55}$ and YOE as shown in FIG. 3 appears to indicate that the luminescence of the former phosphor actually is that of unreacted YOE present in the material. However, such as interpretation is not warranted in view of the following:

(a) if the material did contain unreacted $Y_2O_3$, it should also contain unreacted CaO or, at least, a CaO-rich borate, both of which are unstable in water which is not observed;

(b) the emission spectrum of YOE and $Ca(Y+Eu)B_{0.7}O_{3.55}$ as shown in FIG. 3 are closely similar, but are not identical. Small but significant differences are shown in FIG. 3 of the two spectra under high spectral resolution; and, (c) visual inspection under an optical microscope shows that every particle, not just a fraction, luminesces under excitation by 254 nm ultraviolet.

The actual structure of the material $Ca(Y+Eu)B_{0.7}O_{3.55}$ is not yet known. It may be a solid solution of CaO, $YO_{3/2}$ and $BO_{3/2}$ such that the shape of the yttrium sub-lattice and crystal field symmetry at yttrium sites both are closely the same as those of $Y_2O_3$.

Figure 4:
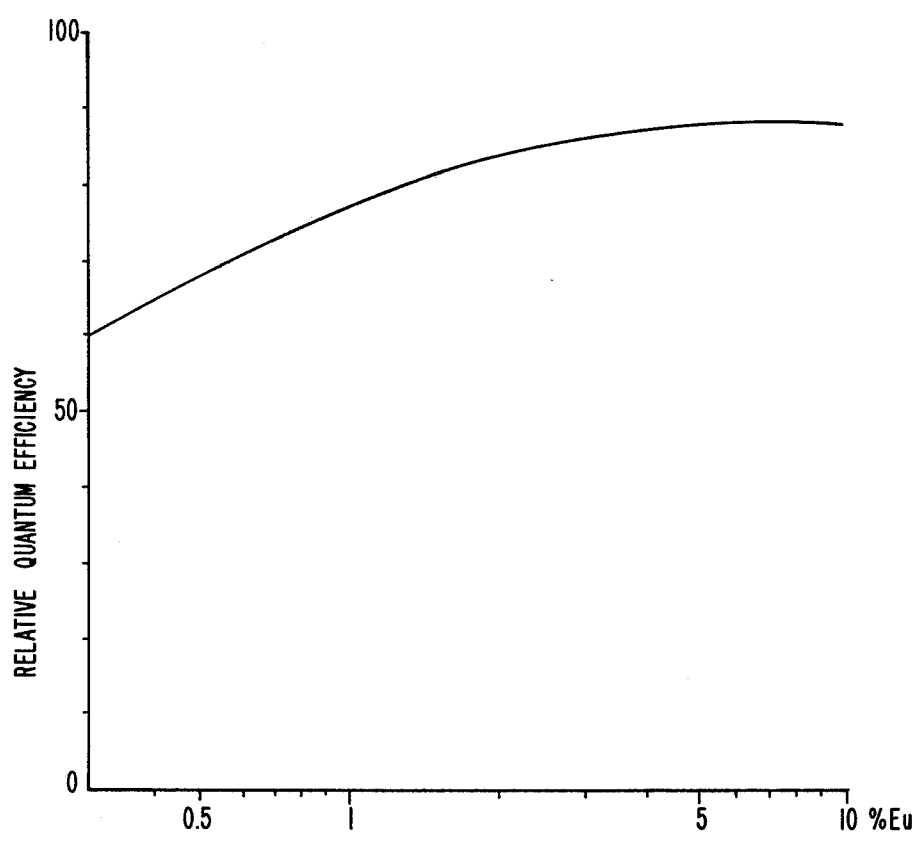

The efficiency of photoluminescence of $Ca(Y+Eu)B_{0.7O3.55}$ phosphor under excitation by 254 nm ultraviolet depends on the concentration of europium used. Measured values are shown in FIG. 4 compared to that of YOE. With a gram-atom ratio of Y to Eu of 10:1, the efficiency of the indicated calcium yttrium borate phosphor approaches 99% of the efficiency of YOE. It is apparent that in order to provide an inexpensive phosphor, the amount of the very expensive europium should be limited. It has been found that by replacing about 5% of the yttrium atoms by europium atoms will provide a good compromise between high efficiency and low cost. With a gram-atom ratio of Y to Eu of 19:1, the efficiency of $Ca(Y+Eu)B_{0.7}O_{3.55}$ is about 85% of that of YOE.

In addition, $Ca(Y+Eu)B_{0.7}O_{3.55}$ phosphor has a density of 3.9 g/cm$^3$, which is less than YOE which has a density of 5.4 g/cm$^3$. Thus, the present phosphor covers, gram by gram, a larger surface area. This together with the reduced amount of europium required results in the material cost of $Ca(Y+Eu)B_{0.7}O_{3.55}$ (with a gram-atom ratio of Y to Eu of 19:1) which is about 40–50% of that of YOE as used in a lamp, for example.

EXAMPLE

A uniform blend is made of 100 grams $CaCO_3$, 107 grams $Y_2O_3$, 8.8 grams $Eu_2O_3$ and 49.4 grams $H_3BO_3$ by dry ball milling using porcelain pebbles. These amounts correspond in relative gram-atom units, to about 100 Ca, 95 Y, 5 Eu, and 70 B. The mixture is fired on open quartz boats in an inert or an oxidizing atmosphere (e.g. nitrogen, air, oxygen) successively for one hour at 600° C., one hour at 1000° C., and four hours at 1200° C., with brief millings between firings to insure uniformity. After the final firing, the material is crushed to a fine white powder comprising particles in the 1–3 μm size range. After screening the phosphor is ready for use.

Samples of the present phosphor composition may sometimes cause a slight alkaline reaction in water suspension producing a pH of about 7.2 to 7.5. This slight alkaline reaction may be caused by traces of unreacted CaO. This can be remedied by neutralizing the samples with a brief washing in an aqueous solution of $NH_4Cl$ (a few grams per hundred cc) at room temperature. After subsequent washing in plain water and drying, the phosphors will be absolutely neutral if again immersed in water.

I claim:

1. A phosphor composition having a higher photoluminescent efficiency than $CaYBO_4$:Eu when excited by 254 nm. radiation and emitting in the red region of the visible spectrum, said phosphor expressible by the general constituent formulation $xCaO.y(Y+Eu)O_{3/2}.zBO_{3/2}$ wherein x is from about 32 to 38, y is from about 31 to 41 and z is from about 25 to 31, and x, y and z express relative molar proportions of said constituents, said phosphor is activated by Eu with the gram-atom ratio of Y to Eu being from about 5:1 to 40:1, and the relative molar proportions of said phosphor constituents fall within the cross-hatched area of the ternary phase diagram as shown in FIG. 1.

2. The phosphor composition of claim 1, wherein the gram-atom ratio of Y to Eu is 19:1.

3. The phosphor composition of claim 1, wherein x is 37, y is 37 and z is 26.

* * * * *